US011502793B2

(12) United States Patent
Rahman et al.

(10) Patent No.: US 11,502,793 B2
(45) Date of Patent: Nov. 15, 2022

(54) COOPERATIVE RADIO RESOURCE ALLOCATION IN A WIRELESS COMMUNICATION NETWORK AND METHODS FOR USE THEREWITH

(71) Applicant: ISRD Sp. z o.o., Piaseczno (PL)

(72) Inventors: Md Arifur Rahman, Piaseczno (PL); Farinaz Kooshki, Piaseczno (PL); Suvidha Mhatre, Barcelona (ES); Slawomir Pietrzyk, Piaseczno (PL); Adam Flizikowski, Bydgoszcz (PL)

(73) Assignee: ISRD Sp. z o.o., Piaseczno (PL)

( * ) Notice: Subject to any disclaimer, the term of this patent is extended or adjusted under 35 U.S.C. 154(b) by 0 days.

(21) Appl. No.: 17/456,193

(22) Filed: Nov. 23, 2021

(65) Prior Publication Data

US 2022/0173849 A1 Jun. 2, 2022

Related U.S. Application Data

(60) Provisional application No. 63/119,174, filed on Nov. 30, 2020.

(51) Int. Cl.
*H04B 7/0426* (2017.01)
*H04W 24/02* (2009.01)
(Continued)

(52) U.S. Cl.
CPC ......... *H04L 5/0035* (2013.01); *H04B 7/0426* (2013.01); *H04B 7/0626* (2013.01); *H04W 24/02* (2013.01); *H04W 88/085* (2013.01)

(58) Field of Classification Search
CPC ............................ H04W 88/085; H04W 24/02
See application file for complete search history.

(56) References Cited

U.S. PATENT DOCUMENTS

2014/0315561 A1 10/2014 Hooli et al.
2019/0090247 A1* 3/2019 Qvarfordt ......... H04W 28/0205
(Continued)

FOREIGN PATENT DOCUMENTS

CN 102752765 A 10/2012
KR 1020090044008 A 5/2009

OTHER PUBLICATIONS

Gerasimenko, et al.; Cooperative Radio Resource Management in Heterogeneous Cloud Radio Access Networks. IEEE Access; Apr. 13, 2015; vol. 3; pp. 397-406.
(Continued)

*Primary Examiner* — Marcus Smith
(74) *Attorney, Agent, or Firm* — Garlick & Markison; Bruce E. Stuckman

(57) ABSTRACT

A cooperative radio resource manager operates by: obtaining constraint data indicating a plurality of radio network constraints and channel state information (CSI) corresponding to wireless communications between a plurality of client devices and a plurality of remote radio heads; performing a first sub-problem optimization, subject to the plurality of radio network constraints, to generate an remote radio head (RRH) to client device association that associates a corresponding one of the plurality of remote radio heads to each of the plurality of client devices and further to generate a physical resource block (PRB) allocation that allocates PRBs of each RRH among the plurality of client devices. The cooperative radio resource manager can also operate by performing a second sub-problem optimization, subject to a subset of the plurality of radio network constraints, to generate a power allocation (PA) that allocates power for uplink and downlink transmissions between the plurality of remote radio heads and the plurality of client devices, based on the RRH to client device association and the PRB allocation generated via the first sub-problem optimization,
(Continued)

for example. In either case, the cooperative radio resource manager can facilitate fronthaul communications via a radio network interface to control the wireless communications between the plurality of remote radio heads and the plurality of client devices via the RRH to client device association, the PRB allocation and/or the PA.

20 Claims, 7 Drawing Sheets

(51) Int. Cl.
  *H04W 88/08* (2009.01)
  *H04L 5/00* (2006.01)
  *H04B 7/06* (2006.01)

(56) References Cited

U.S. PATENT DOCUMENTS

| | | | | |
|---|---|---|---|---|
| 2020/0137594 | A1* | 4/2020 | Notargiacomo | H04W 88/085 |
| 2020/0280863 | A1* | 9/2020 | Cioffi | H04W 24/10 |
| 2020/0366341 | A1* | 11/2020 | Lin | H04W 92/12 |
| 2021/0399854 | A1* | 12/2021 | Outes | H04W 24/02 |

OTHER PUBLICATIONS

International Searching Authority; International Search Repod and Written Opinion; International Application No. PCT/US2021/072609; dated Mar. 15, 2022; 8 pgs.
Mehboob et al.; Genetic Algorithms in Wireless Networking: Techniques, Applications, and Issues arXiv:1411.5323v1 [cs.NI]; Nov. 2014; 27 pgs.
A. Khalili, S. Akhlaghi, H. Tabassum and D. W. K. Ng, "Joint User Association and Resource Allocation in the Uplink of Heterogeneous Networks," in IEEE Wireless Communications Letters, doi: 10.1109/LWC.2020.2970696.
H. U. Sokun, E. Bedeer, R. H. Gohary and H. Yanikomeroglu, "Fairness-oriented resource allocation for energy efficiency optimization in uplink OFDMA networks," 2018 IEEE Wireless Communications and Networking Conference (WCNC), Barcelona, 2018, pp. 1-6.
Hoang, T.D. and Le, L.B., 2017. Joint prioritized scheduling and resource allocation for OFDMA-based wireless networks. IEEE Transactions on Wireless Communications, 17(1), pp. 310-323.
Le, N.T., Tran, L.N., Vu, Q.D. and Jayalath, D., 2019. Energy-efficient resource allocation for OFDMA heterogeneous networks. IEEE Transactions on Communications, 67(10), pp. 7043-7057.
Rahman, M.A.; Lee, Y.; Koo, I. Energy-Efficient Power Allocation and Relay Selection Schemes for Relay-Assisted D2D Communications in 5G Wireless Networks. Sensors 2018, 18, 2865.
Rahman, M.A.; Lee, Y.; Koo, L Joint Relay Selection and Power Allocation through a Genetic Algorithm for Secure Cooperative Cognitive Radio Networks. Sensors 2018, 18, 3934.
S. Pietrzyk and G. J. M. Janssen, "Cooperative Intra-cell Spectrum Reuse Method for OFDMA-based Multiple Access Systems," 2006 International Conference on Microwaves, Radar & Wireless Communications, Krakow, 2006, pp. 630-633, doi: 10.1109/MIKON.2006.4345258.
S. Pietrzyk and G. J. M. Janssen, "Multiuser subcarrier allocation for QoS provision in the OFDMA systems," Proceedings IEEE 56th Vehicular Technology Conference, Vancouver, BC, Canada, 2002, pp. 1077-1081 vol. 2, doi: 10.1109/VETECF.2002.1040769.
S. Pietrzyk, "OFDMA for Broadband Wireless Access," Artech House, 2006-250.
Sultan, R., Song, L., Seddik, K.G. and Han, Z., 2020. Joint resource management with distributed uplink power control in full-duplex OFDMA networks. IEEE Transactions on Vehicular Technology, 69(3), pp. 2850-2863.
W. K. Lai and J. Liu, "Cell Selection and Resource Allocation in LTE-Advanced Heterogeneous Networks," in IEEE Access, vol. 6, pp. 72978-72991, 2018.
Y. Liu, X. Yang, I. C. Wong, Y. Wang and L. Cuthbert, "Evaluation of Game Theory for Centralized Resource Allocation in Multi-Cell Network Slicing," 2019 IEEE 30th Annual International Symposium on Personal, Indoor and Mobile Radio Communications (PIMRC), Istanbul, Turkey, 2019, pp. 1-6.
Z. Lin and Y. Liu, "Joint Uplink-Downlink Resource Allocation in OFDMA Cloud Radio Access Networks," 2018 IEEE International Conference on Communications (ICC), Kansas City, MO, 2018, pp. 1-6.
Zhang, X., Chang, T.H., Liu, Y.F., Shen, C. and Zhu, G., 2019. Max-min fairness user scheduling and power allocation in full-duplex OFDMA systems. IEEE Transactions on Wireless Communications, 18(6), pp. 3078-3092.
Zhao, N., Liang, Y.C., Niyato, D., Pei, Y., Wu, M. and Jiang, Y., 2019. Deep reinforcement learning for user association and resource allocation in heterogeneous cellular networks. IEEE Transactions on Wireless Communications, 18(11), pp. 5141-5152.

* cited by examiner

COOPERATIVE RADIO RESOURCE ALLOCATION IN A WIRELESS COMMUNICATION NETWORK AND METHODS FOR USE THEREWITH

CROSS-REFERENCE TO RELATED APPLICATIONS

The present U.S. Utility Patent application claims priority pursuant to 35 U.S.C. § 119(e) to U.S. Provisional Application No. 63/119,174, entitled "COOPERATIVE RADIO RESOURCE ALLOCATION IN A WIRELESS COMMUNICATION NETWORK AND METHODS FOR USE THEREWITH", filed Nov. 30, 2020, which is hereby incorporated herein by reference in its entirety and made part of the present U.S. Utility Patent Application for all purposes.

FIELD OF THE DISCLOSURE

The subject disclosure relates to control of wireless communication networks.

BRIEF DESCRIPTION OF THE DRAWINGS

Reference will now be made to the accompanying drawings, which are not necessarily drawn to scale, and wherein.

DETAILED DESCRIPTION

Figure 1:
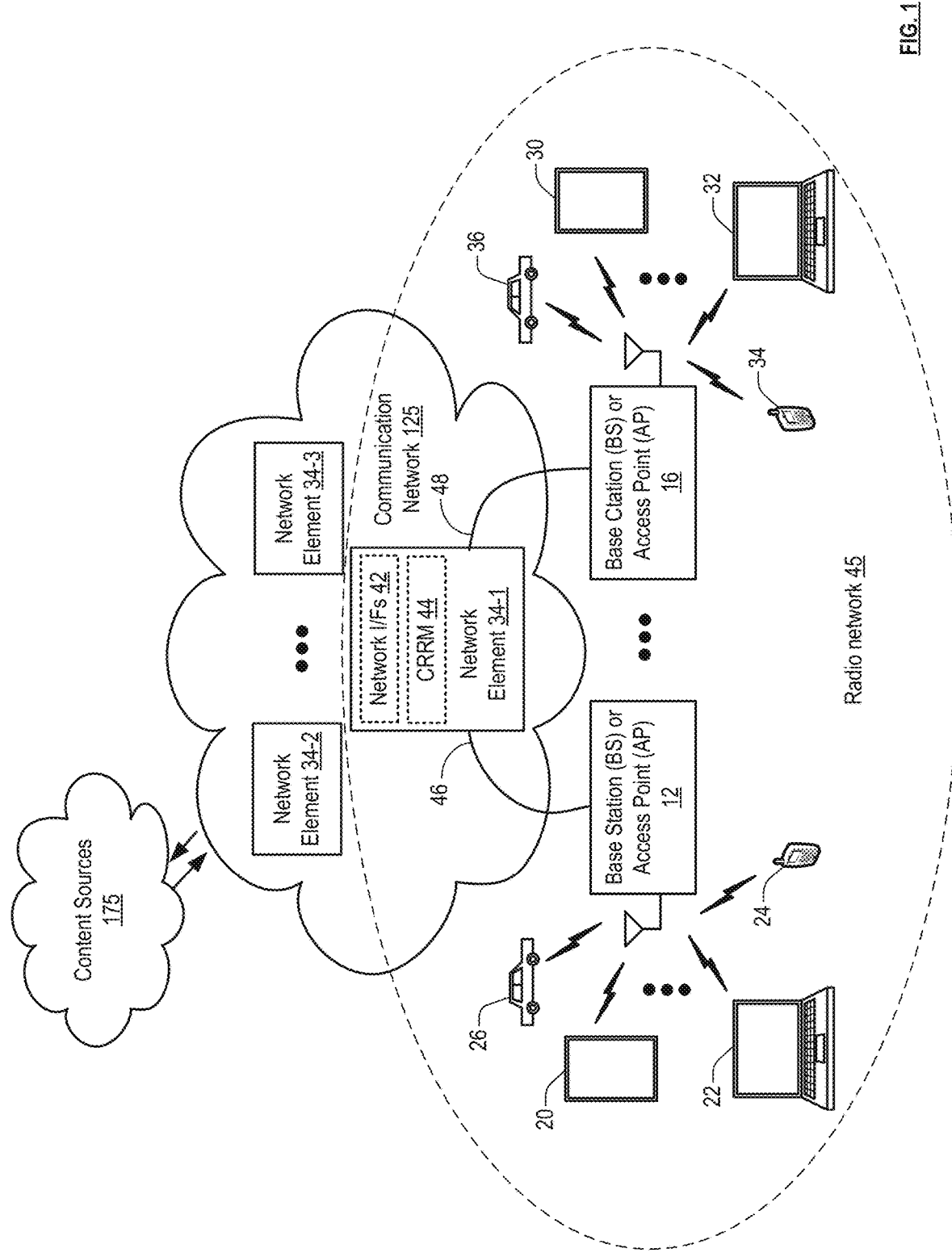
FIG. 1 is a schematic/block diagram illustrating an example of a communications network in accordance with various aspects described herein.

One or more examples are now described with reference to the drawings, wherein like reference numerals are used to refer to like elements throughout. In the following description, for purposes of explanation, numerous details are set forth in order to provide a thorough understanding of the various examples. It is evident, however, that the various examples can be practiced without these details (and without applying to any particular networked environment or standard).

Referring now to FIG. 1, a schematic/block diagram is shown illustrating an example of a communications network 125, such as a core communications network or other wide area network in accordance with various aspects described herein. In particular, the communications network 125 includes a plurality of network elements 34, such as network elements 34-1, 34-2 and 34-3 that are shown.

In various examples, the network elements 34 are interconnected via transport links that can be wired, optical and/or wireless links that, for example, support encapsulated and encrypted transport. The network elements 34 can be implemented, for example, via radio access network controllers, programmable switches, edge servers, soft switches, network gateways, media distribution hubs, and/or other routers, edge devices, switches or network nodes and combinations thereof that themselves can be implemented, for example, via special purpose hardware, and/or via general purpose hardware computing programmed to perform their respective functions.

The communications network 125 operates to support communications of the radio network 45. In operation, the communication network 125 transports data received from content sources 175 or other data content transport clients, and/or data conveying other communications between wireless communication devices. This data can include, e.g., audio, video, graphics, text or other media, applications control information, billing information, network management information and/or other data. The core communication network 125 also operates to manage access by the wireless communication devices, provides billing and network management and supports other network functions.

The wireless communication devices include tablets 20 and 30, laptops 22 and 32, mobile phones 24 and 34, vehicles 26 and 36 and/or other fixed or mobile communication device. The wireless communications can include signals formatted in accordance with long term evolution (LTE) 4G, 5G, other orthogonal frequency division multiple access (OFDMA) protocols and/or other wireless signaling.

The wireless communication devices communicate with base station or access points 12 or 16 to receive services from the communication network 125. Typically, base stations are used for cellular telephone systems and like-type systems, while access points are typically used for in-home or in-building wireless networks. For direct connections (i.e., point-to-point communications), wireless communication devices communicate directly with the BS or AP 12/16 via an allocated channel, time slot or other resource block of a radio, such as a remote radio head (RRH) or other radio unit. As a consequence, the terms BS, AP and RRH can be used interchangeably in this disclosure. Regardless of the particular type of communication system, each wireless communication device also includes, or is coupled to, a corresponding radio configured for wireless communications via the radio network 45.

In the example shown, the network element 34-1 includes an edge server, radio access network controller and/or other network element or elements having a plurality of network interfaces (I/Fs) 42. The plurality of network interfaces (I/Fs) 42 can include a wide area network interface for operating over one or more backhaul links with other network elements 34 operating to support data transport. In addition, the network interfaces (I/Fs) 42 can support communications with other network elements 34 operating other portions of the radio network 45. The plurality of network interfaces 42 can further support a plurality of other links 46 and 48, such as fronthaul links for upstream and downstream communication with a plurality of wireless communications devices over the radio network 45 via base station (BS) or access points (AP) 12 and 16. For example, the network interfaces 42 include a core network interface configured to communicate backhaul communications with one or more network elements 34 of a core communication network, and a radio network interface configured to communicate fronthaul communications with a plurality of remote radio heads, such as BS or APs 12 or 16 of the radio network 45. The plurality of remote radio heads are configured to engage in wireless communications with a plurality of client devices such as the wireless communications devices shown, which can also be referred to as client devices or user equipment (UEs).

The network element 34-1 also includes a cooperative radio resource manager (CRRM) 44 that operates to support resource management of the radio network 45 including load control and power control, an optionally admission control, packet scheduling, hand-over control, and/or other user plane and control plane functions of a radio network controller/radio access network controller. For example, the CRRM 44 includes a processor and a memory, wherein the memory stores operational instructions that, when executed by the processor, cause the processor to perform operations that include:

obtaining constraint data indicating a plurality of radio network constraints;

obtaining channel state information (CSI) corresponding to the wireless communications between the plurality of client devices and the plurality of remote radio heads;

performing a first sub-problem optimization, subject to a first subset of the plurality of radio network constraints, to generate an remote radio head (RRH) to client device association that associates a corresponding one of the plurality of remote radio heads to each of the plurality of client devices and further to generate a physical resource block (PRB) allocation that allocates PRBs of each RRH among the plurality of client devices.

facilitating the fronthaul communications via the radio network interface to control the wireless communications between the plurality of remote radio heads and the plurality of client devices, via the RRH to client device association, the PRB allocation.

In addition, the operations performed by the processor of the CRRM 44 may or may not further include:

performing a second sub-problem optimization, subject to a second subset of the plurality of radio network constraints, to generate a power allocation (PA) that allocates power for uplink and downlink transmissions between the plurality of remote radio heads and the plurality of client devices, based on the RRH to client device association and the PRB allocation generated via the first sub-problem optimization solution or other allocation of PRBs; and facilitating the fronthaul communications via the radio network interface to control the wireless communications between the plurality of remote radio heads and the plurality of client devices, via the PA.

It should be noted that when a network element 34 includes an radio access network controller (a "Network Controller") the Network Controller and CRRM 44 may be interacting with each other via shared communications for the benefit of the operations above and the nature of interaction may be related to the execution and/or control of one or more of the sub-problem optimization steps. The Network Controller can be implemented in the same network element 34-1 as the CRRM 44. In the alternative, the Network Controller can be implemented in a different network element such as 34-2 or 34-2, etc. In particular, selected functions of CRRM 44 may or may not be exposed to the Network Controller via such communications between these the Network Controller and CRRM 44. Furthermore, selected functions of the operations above may or may not be supported by processing performed inside the Network Controller or performed directly inside the CRRM 44, depending on the particular implementation. In particular, the Network Controller can act as central entity that supports the operation of the proposed algorithm inside the CRRM, may instantiate configuration of the proposed algorithm when it is deployed in more distributed way, or the CRRM 44 may work in a standalone fashion—with no direct communication to the Network controller. It should be noted that the distribution of the CRRM 44 can also mean that it could be operating outside of the Network Element 34-1, in a way that it may be located at the Base Station/Access Point/RRH 12 or 16.

In addition, any of the operations above, including the RRH to client device association, the PRB allocation and the PA, can be performed/updated in real time. In this fashion, the RRH to client device association, the PRB allocation and the PA, can be performed/updated for each PRB on a PRB-by-PRB basis. In the alternative, one or more of these three factors can be performed/updated on a non-realtime or pseudo-realtime basis. For example, the RRH to client device association and the PRB allocation can be performed/updated once every x PRBs, while the PA can be performed every y PRBs, where x and y are integers greater than 0 and may be the same or different. In a further example, the RRH to client device association, the PRB allocation and the PA can be performed/updated every T milliseconds. In another example, the RRH to client device association and the PRB allocation can be performed/updated once every T milliseconds, while the PA can be performed every zT milliseconds, where z is an integer greater than 1. In yet another example, the CSI and/or position of each client device can be monitored and the RRH to client device association, the PRB allocation and the PA can be performed/updated when the CSI and/or position of one or more client devices change by more than a predetermined percentage.

Further details regarding the operation of network element 34-1 and radio resource manager 44, including several optional functions and features, will be discussed in conjunction with the figures that follow.

Consider an example where the CRRM 44 operates via a uplink (UL) and downlink (DL) cooperative radio resource management (CRRM) scheme in an OFDMA-based single-tier homogeneous network architecture where the resources are allocated by checking interference level of other remote radio heads (RRH's) to maximize the system capacity (bps/Hz)/km2 of the networks. A joint optimization solution for CRRM can be employed for OFDMA-based mobile networks to maximize the system capacity (bps/Hz)/km$^2$ to support the enhanced mobile broadband (eMBB) use case of 5G networks. The CRRM scheme can be also implemented separately in a traditional cellular wireless network where the CRRM scheme separately manages resources for DL and UL transmission. Consider the case where each RRH connects with the edge server via a fronthaul link and the functionality of a RAN controller is implemented within the edge server. Therefore, the global information of the underlying system is available at the CRRM 44 to manage the radio resources of the radio network 45.

Optimal user association, PRB allocation, and power allocation of an OFDMA-based single-tier homogeneous network is a complex process that requires all information from all the UEs or other client devices. Furthermore, the CRRM problem comprised of UL/DL scheduling, PRB allocation, user association, and power allocation of an OFDMA-based mobile system is a non-convex mixed integer non-linear programming problem (MINLP) that is difficult to solve due to the presence of binary integer of PRB allocation and unified architecture (UA) variable in the problem. The convergence speed of other solutions is very slow and impossible to adopt for real-time systems. Consider an example where the CRRM 44 operates via numerical optimization via a modified genetic algorithm (MGA) or other optimization technique to solve the binary variables of the CRRM problem because of its quick convergence behavior of the objective function (data rate). The real-valued variables of the CRRM problem, i.e., the power allocation for the DL and UL transmissions with the given solution by the MGA can also be solved via numerical optimization by adopting a modified particle swarm optimization (MPSO) algorithm or other optimization technique to satisfy the power budget and QoS constraints of the optimization problem. Whichever of these methodologies/operations are employed, either singly or in combination, serve to improve the technology of radio resource management by providing realtime and/or pseudo-realtime techniques for cooperative and joint resource allocation of radio resources, subject to a set of system constraints, that maximize or otherwise enhancing capacity while eliminating or otherwise reducing CCI. While described above specifically in terms of an MGA, and MPSO, other swarm optimization techniques, other genetic programming techniques, differential evolution, evolutionary programming or other evolutionary algorithms, integer programming or other dynamic programing, or other search or optimization algorithms can likewise be employed.

Figure 2:
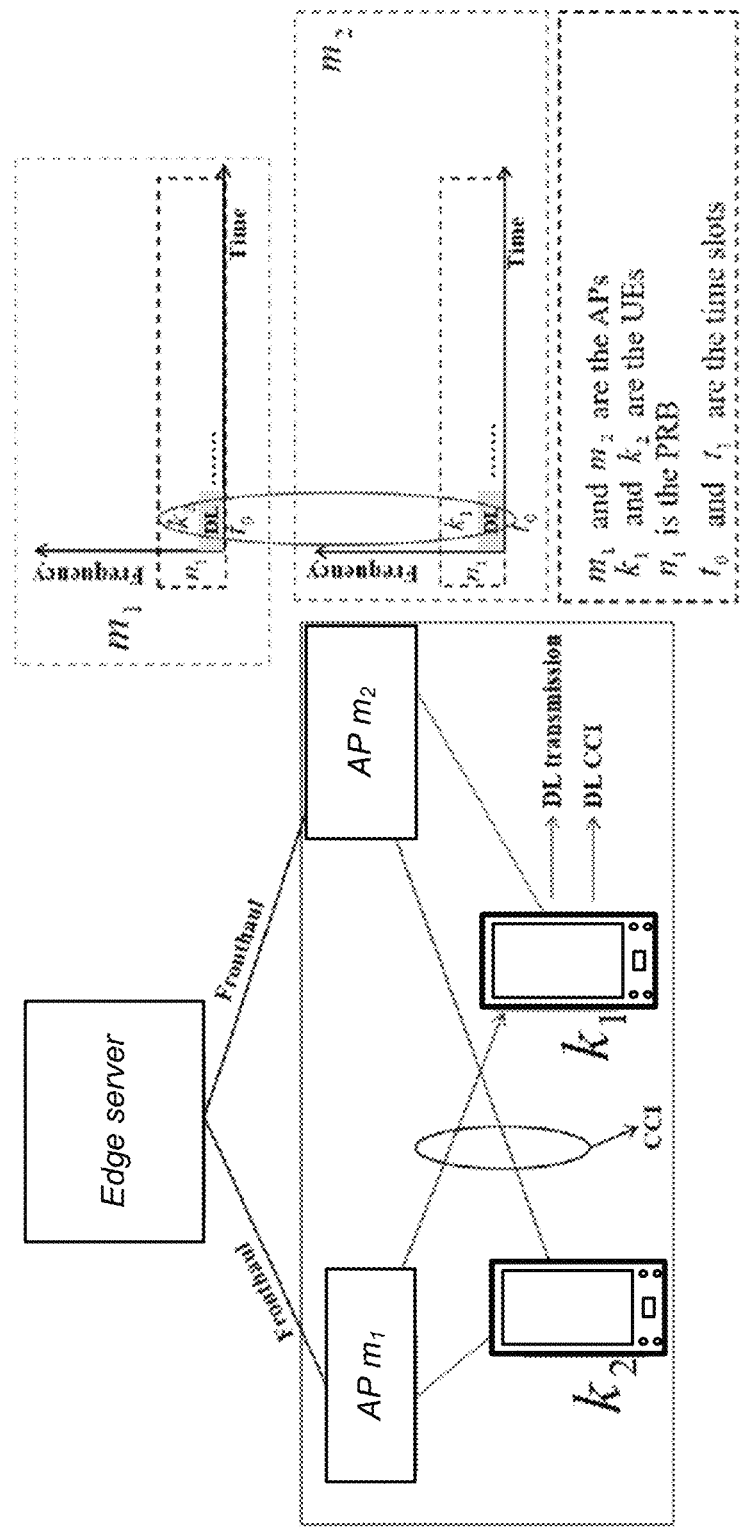
FIG. 2 is a pictorial/block diagram illustrating an example of a radio network in accordance with various aspects described herein.
Figure 3:
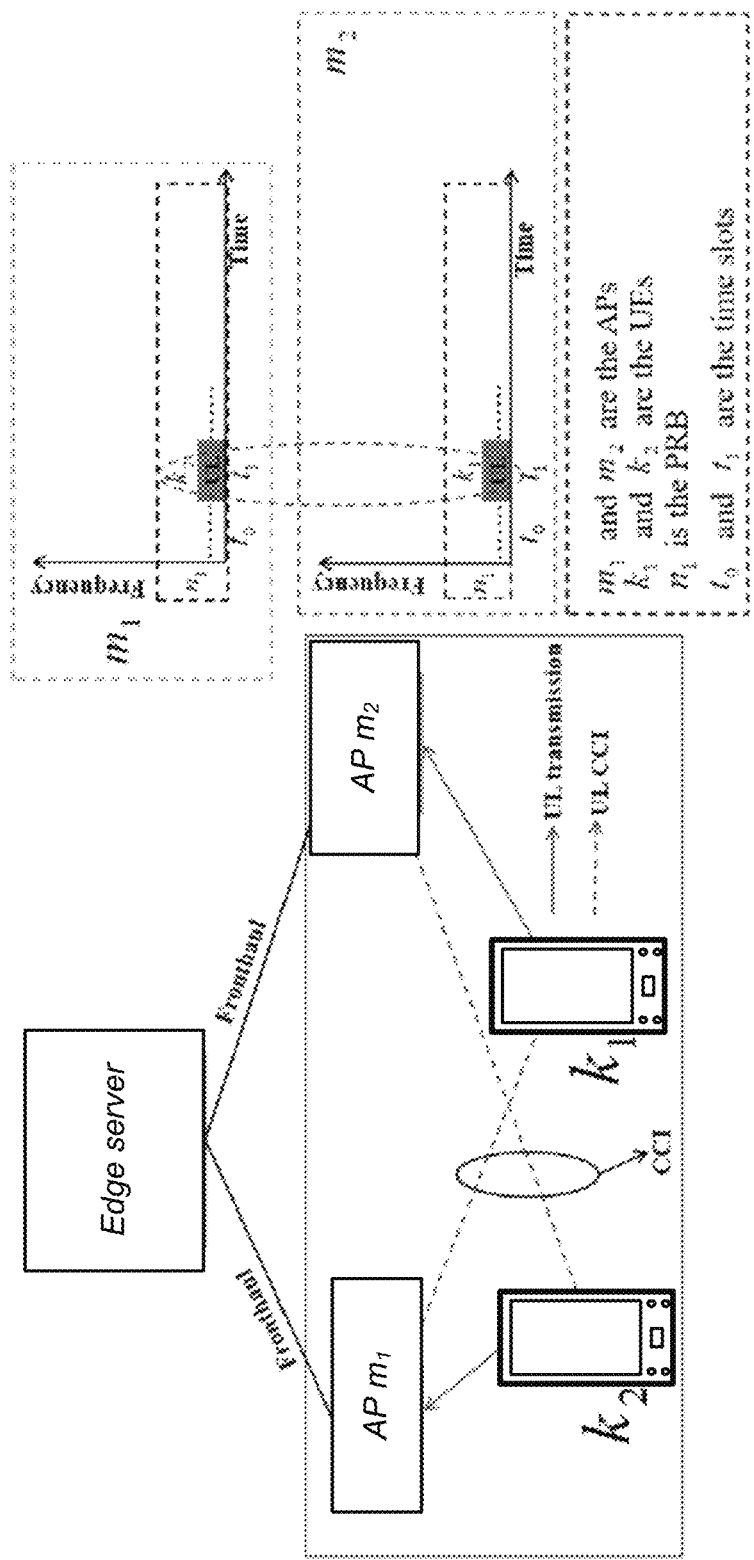
FIG. 3 is a pictorial/block diagram illustrating an example of a radio network in accordance with various aspects described herein.

FIGS. 2 and 3 are a pictorial/block diagrams illustrating examples of a radio network in accordance with various aspects described herein. The further operation of the CRRM 44, including several optional functions and features, can be described in conjunction with the example that follows. Consider an uplink (UL) and downlink (DL) radio resource management (RRM) scheme in an OFDMA-based single-tier homogeneous network architecture as shown in FIGS. 2 and 3 where the users will associate with the remote radio heads (RRHs) for both UL and DL transmission using OFDMA. Consider a system model, where each user is served by a single and randomly deployed RRH. It is assumed that each RRH connects with the edge server via a fronthaul link, e.g., ethernet, PLC or optical fronthaul and each RRH communicates with the UEs over wireless channels. The edge server can conduct joint processing of the RAN protocol stack and centralized radio resource management.

Assume that the system operates in time division duplex (TDD) mode. Therefore, the co-channel interference (CCI) can occur when the UL and DL transmissions are executed in the same subframe of transmission. A time frame consists of a number of subframes. The total frame duration is divided into a set of time slots $\tau=\{1, 2, 3, \ldots, \tau\}$ each with a duration of 1 millisec and consisting of one physical resource block (PRB) of 180 kHz. The entire system model comprises $K=\{1, 2, 3, \ldots, K\}$ set of users, $M=\{1, 2, 3, \ldots, M\}$ set of APs, and the spectrum which can be shared among all users in UL and DL and it is divided in $N=\{1, 2, 3, \ldots, N\}$ PRB's. It can also be assumed that a user can only be connected to one RRH and a user may be assigned with one or multiple PRB's as long as the combined transmit powers of a user on all its allocated PRB's does not surpass the maximum transmit power. Further assume that AWGN at all users has an independent circular symmetric complex random variance with zero mean and variance of $\sigma^2$.

Assume that the channel has frequency selective fading behavior and users are considered to have a mobility model based on a corresponding network environment. In particular, different mobility models can be implemented and selected for each client device. For example, a fixed or stationary mobility model, a pedestrian mobility model, a vehicular mobility model, a drone mobility model, etc. can be selected based on communications from the client device that define the particular device. Furthermore, the particular mobility model from a predetermined set of mobility models can be selected based on observed mobility data associated with each client device. A fixed mobility model can be selected in response to a substantial lack of motion. In the alternative, clustering algorithms, machine learning models and other prediction techniques can be utilized to recognize and segregate the mobility type associated with client devices of different types in order to select the proper mobility model for each device.

The CSI can be extracted from the database of the RAN controller incorporated in the edge server. Therefore, we assume that potentially imperfect CSI is available for operation of the CRRM at the edge server. Further assume that the UL and the DL will occur on the same frequency but over different time slot—i.e., TDD mode or the UL and DL will occur on the same time but over different frequency—i.e., FDD mode. To avoid CCI, each resource block in each time slot can be assigned to either UL or DL of a user. To this end, let the binary variable indicating the UL and DL switching on RB n and it can be expressed as:

$$a_{k,n,t} = \begin{cases} 1, & \text{if the } RB \ n \text{ is allocated to the user } k \text{ for } UL \text{ in the timeslot } t \\ 0, & \text{Otherwise} \end{cases}$$

$$b_{k,n,t} = \begin{cases} 1, & \text{if the } RB \ n \text{ is allocated to the user } k \text{ for } DL \text{ in the timeslot } t \\ 0, & \text{Otherwise} \end{cases}$$

A RRH is selected to communicate for each user on each time slot for either UL or DL. The RB allocation and RRH selection on RB n in UL and DL is also indicated by a binary decision variable $$y^U_{k,m,n} = \begin{cases} 1, & \text{if user } k \text{ assigned to } RRH \ m \text{ on } RB \ n \text{ for } UL \\ 0, & \text{otherwise} \end{cases}$$

$$y^D_{k,m,n} = \begin{cases} 1, & \text{if user } k \text{ assigned to } RRH \ m \text{ on } RB \ n \text{ for } DL \\ 0, & \text{otherwise} \end{cases}$$

The corresponding RRH of the considered system model which is serving the user in UL and DL can be expressed as follows $$M^U_n = \{m \in M \mid y^U_{k,m,n} = 1\}, n \in N$$

$$M^D_n = \{m \in M \mid y^D_{k,m,n} = 1\}, n \in N$$

Thus the RRH in $M_n^U$ serve $k_n$ for UL on RB n if the binary variable indicator of UL transmission in the t-th time slot $\alpha_{k_n t}=1$ otherwise 0. In the case of DL, the AP $M_n^D$ in serve $k_n$ for DL on RB n if the binary variable indicator of DL transmission in the t-th time slot $b_{k_n t}=1$, otherwise 0.

In UL, let us denote $h_{k,m,n}^U$ and $P_{k,n}^U$ are the channel coefficient including path loss, shadowing, and frequency selective fading between the k-th user and the RRH m and the transmit power of the user k in PRB n, respectively. The channel coefficient can be extracted from the imperfect CSI measurement between the plurality of client devices and the plurality of RRHs. Then the SINR of k-th user to the RRH m on PRB n can be expressed as $$\gamma_{k,m,n}^U = \frac{P_{k,n}^U |h_{k,m,n}^U|^2}{I_{k,m,n}^U + \sigma^2}$$

The CCI from the l-th user to the k-th user can on the n-th PRB be formulated as $$I_{k,m,n}^U = \sum_{l \in K/k} P_{l,n}^U |h_{l,m,n}^U|^2$$

The CRRM algorithm that solves the first binary problem can select an RRH on each PRB for either UL or DL. The joint PRB allocation and RRH selection is indicated by a binary decision variable. The data rate of UL can be expressed as $$R_{k,n}^U = B_w \log_2\left(1 + \frac{y_{k,m,n}^U P_{k,n}^U |h_{k,m,n}^U|^2}{I_{k,m,n}^U + \sigma^2}\right)$$

In DL, we use $h_{k,m,n}^D$ to denote the channel coefficient including path loss, shadowing, and frequency selective fading from RRH m to user k on PRB n. Let us assume that $P_{m,n}^D$ is the transmit of RRH m on PRB n. The SINR of k-th user from the RRH of m on the PRB n can be expressed as The CCI from the l-th user to the k-th user can on the n-th PRB be formulated as $$\gamma_{k,m,n}^D = \frac{P_{m,n}^D |h_{k,m,n}^D|^2}{I_{k,m,n}^D + \sigma^2}$$

The CCI from the l-th AP to the m-th AP on the n-th PRB be formulated as $$I_{k,m,n}^D = \sum_{l \in M/m} P_{l,n}^D |h_{k,l,n}^D|^2$$

The data rate of DL can be expressed as $$R_{k,n}^D = B_w \log_2\left(1 + \frac{y_{k,m,n}^D P_{m,n}^D |h_{k,m,n}^D|^2}{I_{k,m,n}^D + \sigma^2}\right)$$

The objective is to maximize the system throughput by jointly optimizing the UL/DL scheduling, PRB allocation, RRH selection and power allocation. Therefore, our problem can be mathematically formulated as $$\max_{\{a_{k,n,t}, b_{k,n,t}, y_{k,m,n}^U, y_{k,m,n}^D, P_{k,n}^U, P_{k,n}^D\}} = \sum_{k \in K} \sum_{m \in M} \sum_{t \in T} [a_{k,n,t} R_{k,n}^U + b_{k,n,t} R_{k,n}^D]$$

[Equation #1]

Figure 4:
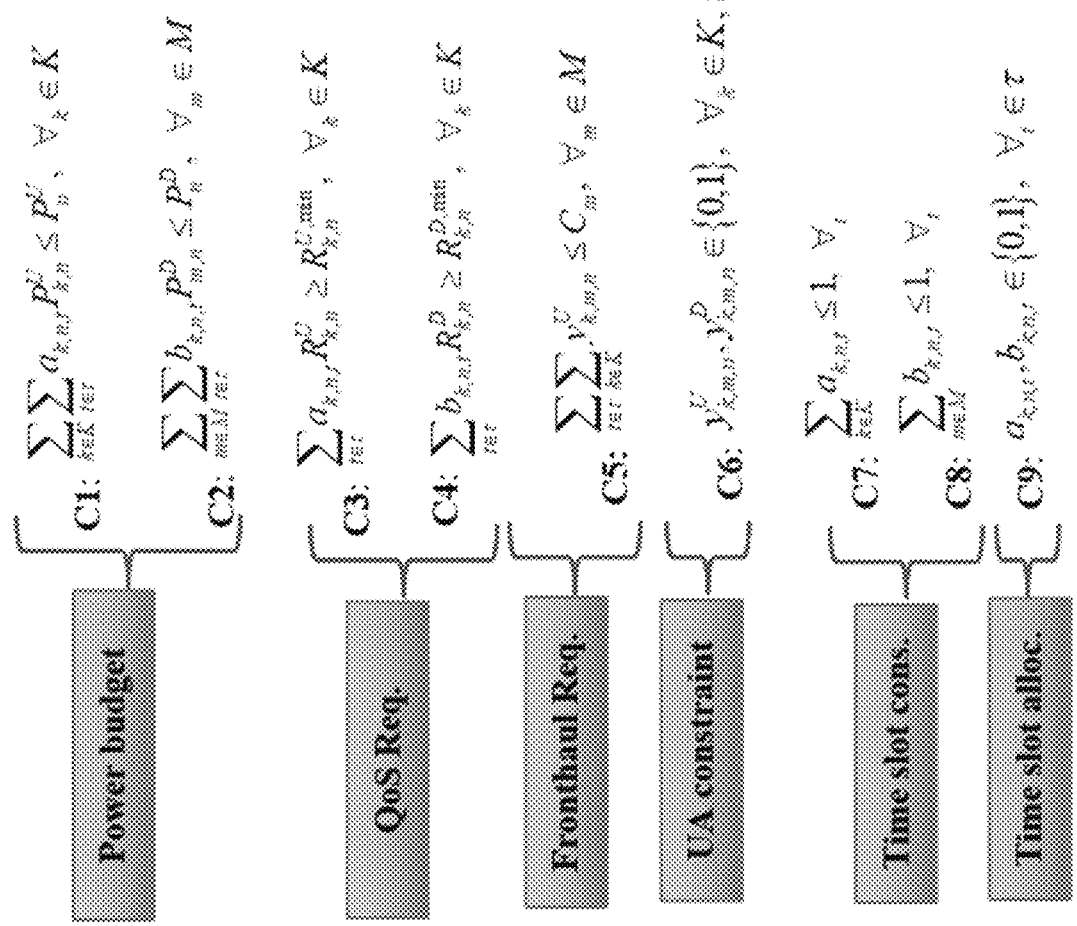
FIG. 4 is a table illustrating an example set of radio network constraints in accordance with various aspects described herein.

FIG. 4 is a table illustrating an example set of radio network constraints in accordance with various aspects described herein. An example set of nine constraints, C1-C9 are shown. The constraint (C5) indicates that the m-th RRH can occupy at most $C_m$ PRB, which guarantees a certain degree of fronthaul capacity constraints of the RRHs. The optimization problem is non-convex due to integer constraints (C6-C9). Note that, without the PA, the reduced problem is a PRB allocation and RRH selection problem which is a combinatorial NP-hard problem.

In this work, the main OP can be subdivided into two sub-problems. The binary problems i.e., the RRH to UE (or other client device) association and PRB allocation, can be considered as the sub-problem 1. To solve the sub-problem 1, a modified genetic Algorithm (MGA) or other strong search/optimization technique can be employed to solve the binary problem. In order implement the MGA, the following inputs can be used to obtain the optimal solution of the sub-problem 1: channel coefficient (between the plurality of client devices and the plurality of RRHs), noise variance, channel bandwidth, maximum allowable DL power, minimum QoS requirement of the users, number of available physical resource blocks, number of available RRH, number of users, MGA system parameter. The MGA will solve the sub-problem 1 and provide an optimal solution of the RRH to UE association and PRB allocation. Later on, the output of the MGA i.e., the RRH to UE association and PRB allocation solution will be adopted for solving the PA problems of DL and UL transmissions which is a real-valued parameter problem of the original problem in Equation #1 (sub-problem 2). If the PA is not adopted, a fixed transmit power at the MGA will operate and provide an optimal solution (RRH-UE association and PRB allocation) that maximizes the overall system capacity of the networks.

Sub-problem 2 of the CRRM problem can be solved by a different optimization technique. For example, a modified particle swarm optimization (MPSO) algorithm can be used to satisfy the power budget and QoS requirements of the optimization problem. In this approach, the modulation and coding scheme (MCS) can be assigned based on the SINR of the system—as indicated by CSI, for example. The power can also be checked to satisfy the constraints C1 and C2 of the optimization problem. The fitness (data rate) of the system can be recalculated based on the power. The QoS constraints per user C3 and C4 can also be satisfied by the MPSO algorithm. Meanwhile, the process of allocating DL and UL transmission powers can be operated until the convergence criterions are satisfied. The optimal DL and UL transmission power are determined from the results at the end of the MPSO algorithm. Using the MGA for the RRH to UE association and PRB allocation sub-problem based on, for example, constraints C3-C9, and the MPSO on constraints C1-C4 ensures that all the constraints used in the optimization problem are satisfied. The allocation of the resources by considering the fitness value for all RRHs and modifying the allocation by re-evaluating the fitness value, high cooperation is considered between the RRHs.

The MGA is used specifically to schedule the resources and associate the RRHs with UEs in cooperative manner by the RRM function implemented via the edge server. The MGA has the following steps and each step of the algorithm will execute in each TTI and will provide a sub-optimal solution of the sub-problem 1. Adopting the language of the MGA, the steps are follows:

Step 1 (Initialization): Initial mapping of the populations for all chromosomes Step 2 (Evaluation): Calculate the fitness value (data rate) of each generation and satisfying the constraints of the problem. If the constrains are not satisfied, then the data rate for the certain violated user will be zero. Otherwise, the process of the MGA will start operation for the next step. Step 3 (Selection operation): Use a roulette wheel selection method to breed a new generation to save the best chromosome. The best parents are selected based on calculating the probability of being selected that chromosome amongst the full set of the probability. Step 4 (Crossover operation): In the crossover operation, we do an adaptive single point crossover to generate a new population set with a crossover probability. Step 5 (Mutation operation): An adaptive mutation operation is used in the MGA to generate a new population set. However, in this step, the method can also check for constraints violation and correct newly generated populations and recalculate the fitness value (data rate). Step 6 (Repeat): The steps of the scheme will be repeated for the next generation until the generation is completed or converged. In high SINR region, obtaining proper combinations of the genes to fit the constraint is also a challenging task. Therefore, the best string will be selected based on the additional fitness value. The additional fitness value for each chromosome can be given as:

$$D_3^{(c)} = \left\| \sum_{t \in \tau} \sum_{k \in K} y_{k,m,n}^U - C_m \right\|$$

Figure 5:
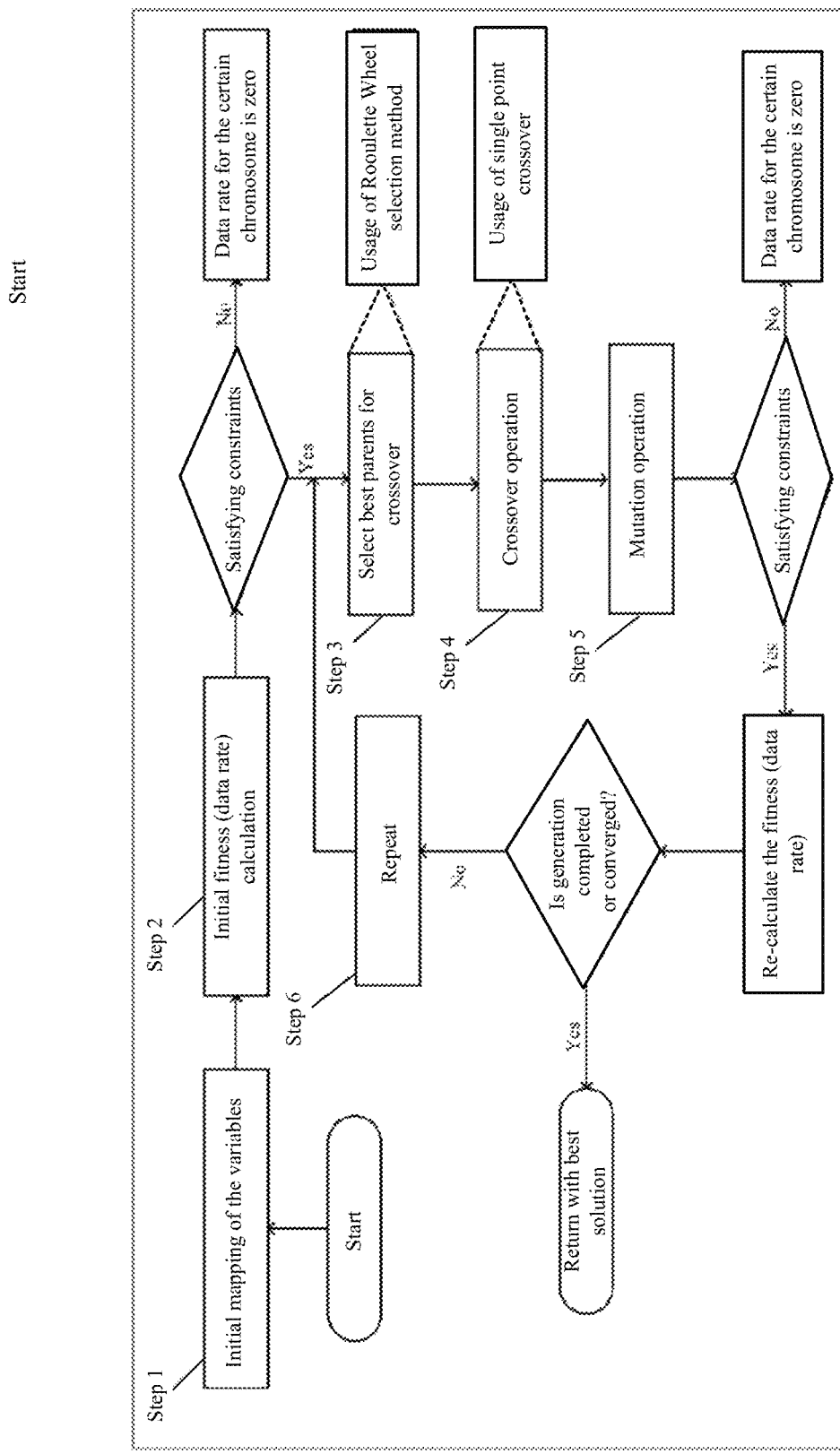
FIG. 5 illustrates a flow diagram of an example, non-limiting example of a method in accordance with various aspects described herein.

FIG. 5 illustrates a flow diagram of an example, non-limiting example of a method in accordance with various aspects described herein. In particular, an example flowchart of an MGA is presented.

For the given time slot, the PRB allocation, and the RRH to UE association determined via the MGA, the PA problem can be decoupled into downlink and uplink PA problem as follows:

$$\max_{\{a_{k,n,t}, b_{k,n,t}, v_{k,m,n}^U, v_{k,m,n}^D, P_{k,n}^U, P_{k,n}^D\}} = \sum_{k \in K} \sum_{m \in M} \sum_{t \in \tau} [a_{k,n,t} R_{k,n}^U + b_{k,n,t} R_{k,n}^D]$$

Subjected to: $C1 - C4$

As the minimum decodable SINR is given to the system for both UL and DL, the minimum transmission of both UL and DL can be determined. Therefore, the minimum transmission power for both UL and DL can be determined by:

$$P_{k,n}^{U,Min} = \frac{\gamma_{k,m,n}^{U,Min}\left(\sigma^2 + \underset{k \in K, m \in M, n \in N}{\operatorname{argmin}} (I_{k,m,n}^U)\right)}{|h_{k^*,m^*,n^*}^U|^2}$$

$$P_{m,n}^{D,Min} = \frac{\gamma_{k,m,n}^{D,Min}\left(\sigma^2 + \underset{k \in K, m \in M, n \in N}{\operatorname{argmin}} (I_{k,m,n}^D)\right)}{|h_{k^*,m^*,n^*}^D|^2}$$

The MPSO-based PA algorithm will search for the optimal solution between the following search boundary:

$$P_{k^*,n^*}^{U,Min} \leq P_{k^*,n^*}^U \leq P_n^U$$

$$P_{k^*,n^*}^{D,Min} \leq P_{k^*,n^*}^D \leq P_n^D$$

The location, z, of the l-th particle l={1, 2, 3, ..., L} in the particle swarm, can be expressed as follows:

$$z_l = \{P_{k,n}^U, P_{m,n}^D\}$$

where l={1, 2, 3, ..., L} and where L denotes the number of particles in the particle swarm. In the MPSO-based PA scheme, we firstly initialize the particles positions and velocities randomly within the upper and lower search boundaries of the problem. Thus, the velocity of the particle can be updated as follows:

$$V_{l,D}^{(i+1)} = \psi^{(j)} V_{l,D}^{(i)} + c_1 g_1 \left(p_{best,l}^{(i)} - z_l^{(i)}\right) + c_2 g_2 \left(g_{best}^{(i)} - z_l^{(i)}\right)$$

$$V_{l,U}^{(i+1)} = \psi^{(i)} V_{l,U}^{(i)} + c_1 g_1 \left(p_{best,l}^{(i)} - z_l^{(i)}\right) + c_2 g_2 \left(g_{best}^{(i)} - z_l^{(i)}\right)$$

The i-th iteration of the MPSO-based PA scheme can be given as follows:

$$\psi^{(i)} = \frac{\psi_{start} - (\psi_{start} - \psi_{end}) \times i^2}{I_{gen}^2}$$

The locations of the particles can be accelerated as follows:

$$z_l^{(i+1)} = z_l^{(i)} + v_l^{(i+1)}$$

Where $Z_i^{(i)}$ is the location of the l-th particle in the i-th iteration. The DR of each particle is re-calculated and confidentially the global optimal fitness (DR) of the system are renewed. The process is repeated until the stopping criteria is meet. The stopping criteria of the MPSO-based PA scheme can be:

$$\frac{DR_{g_{best}}^{(i-1)} - DR_{g_{best}}^{(i)}}{DR_{g_{best}}^{(j)}} > \chi \text{ and } i < I_{gen}$$

Where x is the precision of the algorithm and $I_{gen}$ is the maximum number of generations to generate the particle. As the minimum transmission power for both UL and DL has already been set from the given SINR of the system then, a sub-optimal PA scheme based on the MPSO-based PA algorithm, can be used to maximize the data rate of the networks.

Figure 6:
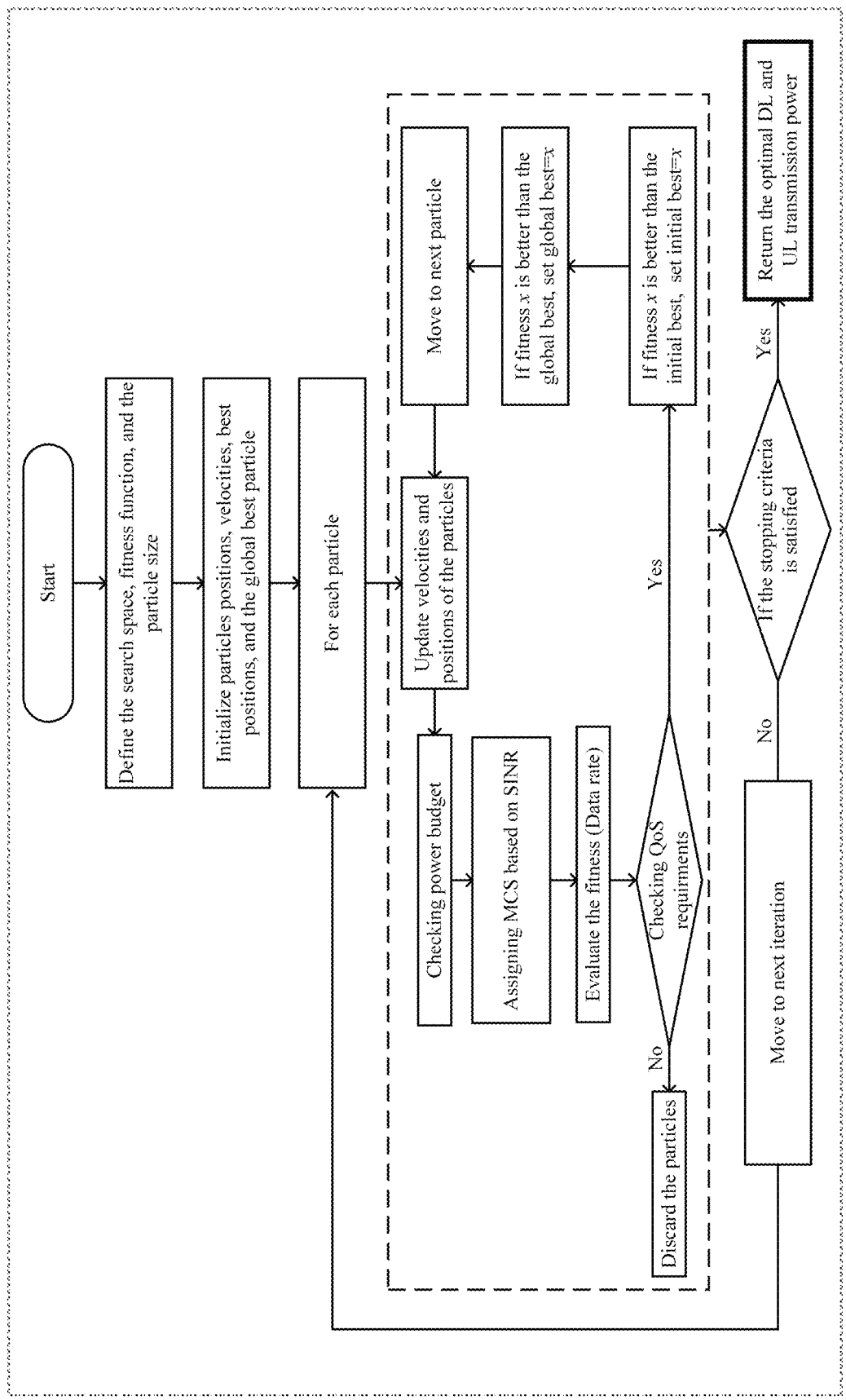
FIG. 6 illustrates a flow diagram of an example, non-limiting example of a method in accordance with various aspects described herein.

FIG. 6 illustrates a flow diagram of an example, non-limiting example of a method in accordance with various aspects described herein. In particular, example procedures of the MPSO scheme are shown. It should be noted that, while many of the techniques described above have been described in terms of the allocation of TDD PRBs, the techniques could likewise be applied to FDD PRBs and/or other resource blocks.

It should be noted that the two optimizations described above for sub-problems 1 and 2 of the CRRM can be performed sequentially, in either order, or in parallel. Furthermore, in various examples, the second optimization may be run less frequently than the first optimization or not at all, depending on the implementation.

Figure 7:
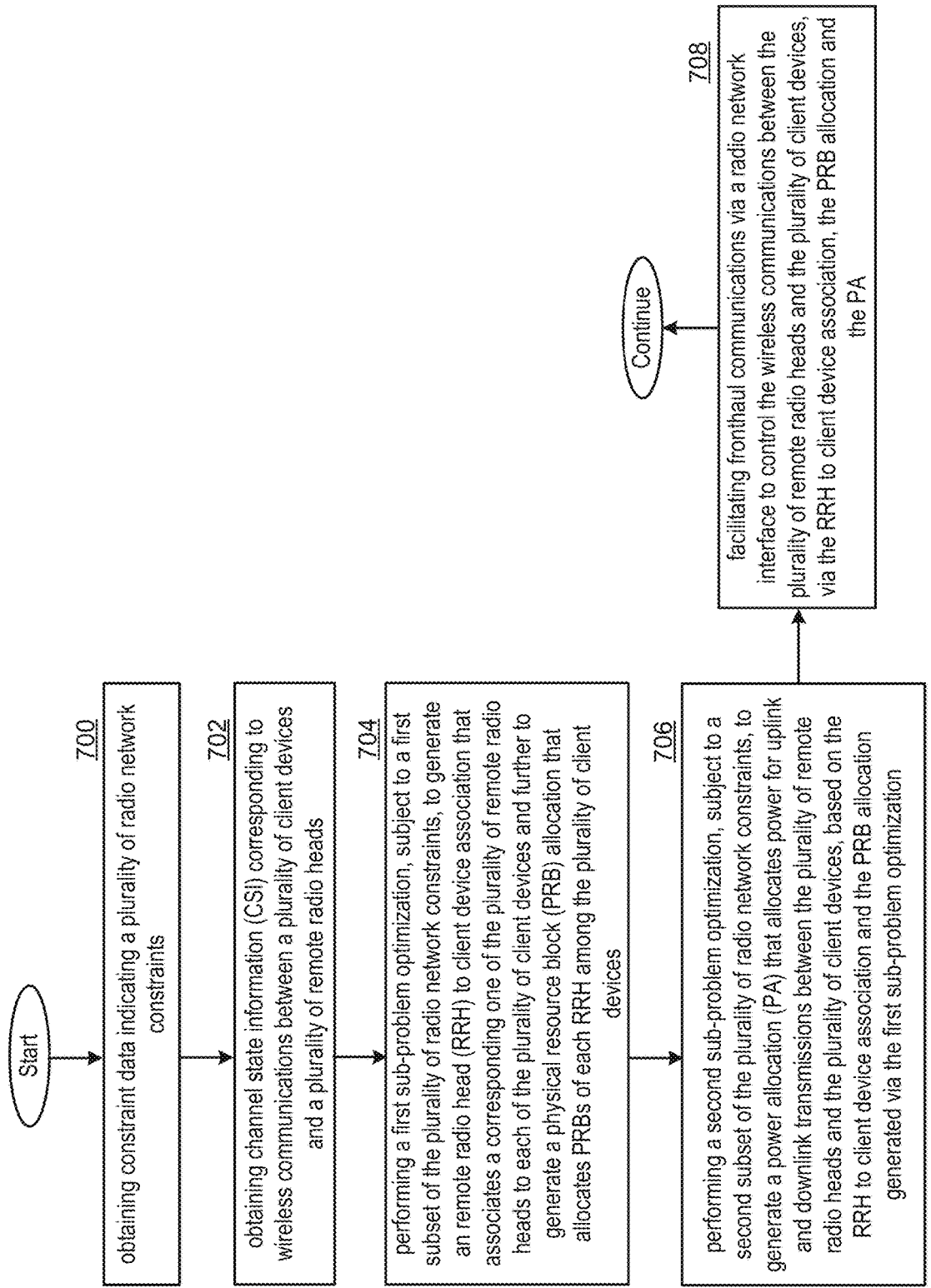
FIG. 7 illustrates a flow diagram of an example, non-limiting example of a method in accordance with various aspects described herein.

FIG. 7 illustrates a flow diagram of an example, non-limiting example of a method in accordance with various aspects described herein. In particular, a method is presented for use in conjunction with one or more functions and features described previously herein. Step 700 includes obtaining constraint data indicating a plurality of radio network constraints. Step 702 includes obtaining channel state information (CSI) corresponding to wireless communications between a plurality of client devices and a plurality of remote radio heads. Step 704 includes performing a first sub-problem optimization such as a binary-valued or other optimization, subject to a first subset of the plurality of radio network constraints, to generate an remote radio head (RRH) to client device association that associates a corresponding one of the plurality of remote radio heads to each of the plurality of client devices and further to generate a physical resource block (PRB) allocation that allocates PRBs of each RRH among the plurality of client devices. Step 706 includes performing a second sub-problem optimization such as a real-valued or other optimization, subject to a second subset of the plurality of radio network constraints, to generate a power allocation (PA) that allocates power for uplink and downlink transmissions between the plurality of remote radio heads and the plurality of client devices, that may or may not be based on the RRH to client device association and the PRB allocation generated via the first sub-problem optimization. Step 708 includes facilitating fronthaul communications via a radio network interface to control the wireless communications between the plurality of remote radio heads and the plurality of client devices via the RRH allocation, the PRB allocation and the PA.

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. The processing module, module, processing circuit, processing circuitry, and/or processing unit can further include one or more interface devices for communicating data, signals and/or other information between the components of the processing module and further for communicating with other devices. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A network element comprises:
a core network interface configured to communicate backhaul communications with one or more network elements of a core communication network;
a radio network interface configured to communicate fronthaul communications with a plurality of remote radio heads of a radio network, wherein the plurality of remote radio heads are configured to engage in wireless communications with a plurality of client devices;
a radio resource manager that includes a processor and a memory, wherein the memory stores operational instructions that, when executed by the processor, cause the processor to perform operations that include:
obtaining constraint data indicating a plurality of radio network constraints;
obtaining channel state information (CSI) corresponding to the wireless communications between the plurality of client devices and the plurality of remote radio heads;
performing an optimization that includes a binary-valued sub-problem optimization subject to a first subset of the plurality of radio network constraints, wherein the binary-valued sub-problem optimization jointly optimizes a remote radio head (RRH) to client device association together with a physical resource block (PRB) allocation by associating a corresponding one of the plurality of remote radio heads to each of the plurality of client devices and further by optimizing uplink and downlink scheduling via selection, by the binary-valued sub-problem optimization, of either uplink or downlink transmission for each PRB of each RRH of the plurality of remote radio heads; and
facilitating the fronthaul communications via the radio network interface to control the wireless communications between the plurality of remote radio heads and the plurality of client devices via the RRH to client device association and the PRB allocation.

2. The network element of claim 1, wherein the optimization further includes a real-valued sub-problem optimization, subject to a second subset of the plurality of radio network constraints, to generate a power allocation (PA) that allocates power for uplink and downlink transmissions between the plurality of remote radio heads and the plurality of client devices; and
wherein facilitating the fronthaul communications via the radio network interface to control the wireless communications between the plurality of remote radio heads and the plurality of client devices is also via the PA.

3. The network element of claim 2, wherein the real-valued sub-problem optimization is based on the RRH to client device association and the PRB allocation generated via the binary-valued sub-problem optimization.

4. The network element of claim 2, wherein the real-valued sub-problem optimization includes performing a modified particle swarm optimization.

5. The network element of claim 2, wherein the second subset of the plurality of radio network constraints, include a plurality of real-valued constraints.

6. The network element of claim 5, wherein the plurality of real-valued constraints, include one or more of power budget constraint and one or more quality of service constraint.

7. The network element of claim 1, wherein the first subset of the plurality of radio network constraints, include a plurality of binary-valued constraints.

8. The network element of claim 7, wherein the plurality of binary-valued constraints include at least one unified architecture variable.

9. The network element of claim 7, wherein the plurality of binary-valued constraints include at least one time slot constraint and at least one time slot allocation constraint.

10. The network element of claim 1, wherein the binary-valued sub-problem optimization includes performing a modified genetic algorithm.

11. A method comprises:
obtaining constraint data indicating a plurality of radio network constraints;
obtaining channel state information (CSI) corresponding to wireless communications between a plurality of client devices and a plurality of remote radio heads;
performing an optimization that includes a binary-valued sub-problem optimization subject to a first subset of the plurality of radio network constraints, wherein the binary-valued sub-problem optimization jointly optimizes a remote radio head (RRH) to client device association together with a physical resource block (PRB) allocation by associating a corresponding one of the plurality of remote radio heads to each of the plurality of client devices and further by optimizing uplink and downlink scheduling via selection, by the binary-valued sub-problem optimization, of either uplink or downlink transmission for each PRB of each RRH of the plurality of remote radio heads; and
facilitating a fronthaul communications via a radio network interface to control the wireless communications between the plurality of remote radio heads and the plurality of client devices via the RRH to client device association and the PRB allocation.

12. The method of claim 11, wherein the optimization further includes a real-valued sub-problem optimization, subject to a second subset of the plurality of radio network constraints, to generate a power allocation (PA) that allocates power for uplink and downlink transmissions between the plurality of remote radio heads and the plurality of client devices; and
wherein facilitating the fronthaul communications via the radio network interface to control the wireless communications between the plurality of remote radio heads and the plurality of client devices is also via the PA.

13. The method of claim 12, wherein the real-valued sub-problem optimization is based on the RRH to client device association and the PRB allocation generated via the binary-valued sub-problem optimization.

14. The method of claim 12, wherein the real-valued sub-problem optimization includes performing a modified particle swarm optimization.

15. The method of claim 12, wherein the second subset of the plurality of radio network constraints, include a plurality of real-valued constraints.

16. The method of claim 15, wherein the plurality of real-valued constraints, include one or more of power budget constraint and one or more quality of service constraint.

17. The method of claim 11, wherein the first subset of the plurality of radio network constraints, include a plurality of binary-valued constraints.

18. The method of claim 17, wherein the plurality of binary-valued constraints include at least one unified architecture variable.

19. The method of claim 17, wherein the plurality of binary-valued constraints include at least one time slot constraint and at least one time slot allocation constraint.

20. The method of claim 11, wherein the binary-valued sub-problem optimization includes performing a modified genetic algorithm.

\* \* \* \* \*